(12) United States Patent
Lara Contreras et al.

(10) Patent No.: US 10,829,038 B1
(45) Date of Patent: Nov. 10, 2020

(54) ILLUMINATED MESSAGE DISPLAY INDICATOR SYSTEM

(71) Applicants: Rodolfo Lara Contreras, Grand Prairie, TX (US); Ivan Lopez, Fort Worth, TX (US)

(72) Inventors: Rodolfo Lara Contreras, Grand Prairie, TX (US); Ivan Lopez, Fort Worth, TX (US)

( * ) Notice: Subject to any disclaimer, the term of this patent is extended or adjusted under 35 U.S.C. 154(b) by 0 days.

(21) Appl. No.: 16/507,279

(22) Filed: Jul. 10, 2019

(51) Int. Cl.
| | | |
|---|---|---|
| *B60Q 1/50* | (2006.01) | |
| *G09F 9/33* | (2006.01) | |
| *G09F 21/04* | (2006.01) | |
| *B60R 11/02* | (2006.01) | |
| *B60Q 1/26* | (2006.01) | |
| *B60Q 1/34* | (2006.01) | |
| *B60R 11/00* | (2006.01) | |

(52) U.S. Cl.
CPC .......... *B60Q 1/503* (2013.01); *B60Q 1/2607* (2013.01); *B60Q 1/2696* (2013.01); *B60Q 1/34* (2013.01); *B60R 11/0229* (2013.01); *G09F 9/33* (2013.01); *G09F 21/048* (2013.01); *B60Q 2900/00* (2013.01); *B60R 2011/0056* (2013.01); *B60R 2011/0063* (2013.01)

(58) Field of Classification Search
CPC .......... B60Q 1/00; B60Q 1/26; B60Q 1/2607; B60Q 1/2696; B60Q 1/30; B60Q 1/302; B60Q 1/34; B60Q 1/50; B60Q 1/503; B60Q 2900/00
See application file for complete search history.

(56) References Cited

U.S. PATENT DOCUMENTS

| | | | | |
|---|---|---|---|---|
| 4,431,984 A | * | 2/1984 | Bileck | B60Q 1/503 200/61.27 |
| 4,631,516 A | * | 12/1986 | Clinker | B60Q 1/503 340/464 |
| 4,868,542 A | | 9/1989 | Thompson | |
| 4,928,084 A | | 5/1990 | Reiser | |
| 5,426,414 A | * | 6/1995 | Flatin | B60Q 1/503 116/28 R |
| 5,652,565 A | * | 7/1997 | Salcedas | B60Q 1/302 340/467 |
| 5,905,434 A | * | 5/1999 | Steffan | B60Q 1/50 116/28 R |
| 7,952,489 B1 | * | 5/2011 | Paterno | B60Q 1/503 340/426.32 |
| 2005/0083183 A1 | * | 4/2005 | Cao | B60Q 1/268 340/426.13 |

(Continued)

*Primary Examiner* — Andrew W Bee
(74) *Attorney, Agent, or Firm* — Sanchelima & Associates, P.A.; Christian Sanchelima; Jesus Sanchelima

(57) ABSTRACT

An illuminated message display indicator system for vehicles is disclosed herein. There is to be one illuminated message display indicator system on each of the left and right side on the rear windshield of a vehicle. The illuminated message display indicator system communicates with the turning lever found inside of a vehicle wherein a driver uses the lever to indicate their intended turn direction. So, if a left turn is to be made, the illuminated message display indicator system found on the rear left windshield illuminates to display a message. The illuminated and displayed message may be customized per the choice of the user. This illuminated message display indicator system promotes manners and safer driving to reduce dangers on the road.

10 Claims, 3 Drawing Sheets

(56) References Cited

U.S. PATENT DOCUMENTS

| | | | | |
|---|---|---|---|---|
| 2005/0134441 A1* | 6/2005 | Somuah | ............. | B60Q 1/503 340/435 |
| 2007/0030139 A1* | 2/2007 | Ellison | ............. | B60Q 1/503 340/482 |
| 2017/0320431 A1* | 11/2017 | John | ............. | B60Q 1/503 |
| 2019/0277471 A1* | 9/2019 | Christian | ............. | B60Q 1/2696 |

* cited by examiner

ILLUMINATED MESSAGE DISPLAY INDICATOR SYSTEM

BACKGROUND OF THE INVENTION

1. Field of the Invention

The present invention relates to a vehicle mounted system. More particularly, the present invention relates to a system that illuminates a message display after a vehicle previously indicating a turn has made the turn.

2. Description of the Related Art

Due to busy life and heavy traffic jams, everybody is in such a rush to reach their destination that they don't even express gratitude towards others. For example, while driving a vehicle on a straight road, all of a sudden, the driver may be required to make a turn towards the left or right. The driver indicates about the direction they want to turn through one of the two signal lights or turn lights that are a part of the tail light assembly of the vehicle. During this course of action, drivers in the other vehicles following the vehicle may feel irritated or disturbed about the erratic turn negotiated by the vehicle. Several designs for direction display systems have been designed in the past. None of them, however, display a message on one of the two sides of the rear windshield corresponding to the negotiated turn of the vehicle.

Applicant believes that a related reference corresponds to United States Patent Application 2014/0005860 issued to Marion Chance discloses a digital vanity display system for a motor vehicle that is controllable via mobile phone. U.S. Pat. No. 4,868,542 issued to Michael L. Thompson discloses an automobile signaling system that includes a digital sign that may be programmed to display words and arrows. United States Patent Application 2014/0002260 issued to Elta Wright discloses a remote controlled and driver operated flashing sign that fastens by suction cups to a rear glass of a car. United States Patent Application 2007/0030139 issued to Ellison discloses a sign that is attachable to the rear window of a vehicle to display a message. U.S. Pat. No. 4,928,084 issued to Steven M. Reiser discloses a combined vehicle brake light and message display apparatus. U.S. Design Pat. 495,747 issued to Josephus Johannes Maria discloses an ornamental design for a courtesy signal light. and Foreign Patent Document EP0214594A2 issued to Gerald Clinker discloses an illuminated vehicle sign that is displayed on the rear of the vehicle to communicate with drivers behind the vehicle.

However, the above references differ from the present invention because the present invention discloses an illuminated message display indicator system which displays messages while the vehicle is attempting to make a turn.

Other documents describing the closest subject matter provide for a number of more or less complicated features that fail to solve the problem in an efficient and economical way. None of these patents suggest the novel features of the present invention.

SUMMARY OF THE INVENTION

It is an object of present invention to provide an illuminated message display indicator system for vehicles.

It is still an object of present invention to provide an illuminated message display indicator system for vehicles after they have made a turn.

It is another object of the present invention to encourage drivers to use their turn signals more frequently as they are aware that the present invention will result in a pleasant message for other drivers.

It is still another object of the present invention to provide an illuminated message display indicator system that can be retrofitted onto all vehicles that use turning signals.

It is yet another object of this invention to provide such a device that is inexpensive to implement and maintain while retaining its effectiveness.

Further objects of invention will be brought out in following part of specification, wherein detailed description is for purpose of fully disclosing invention without placing any limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
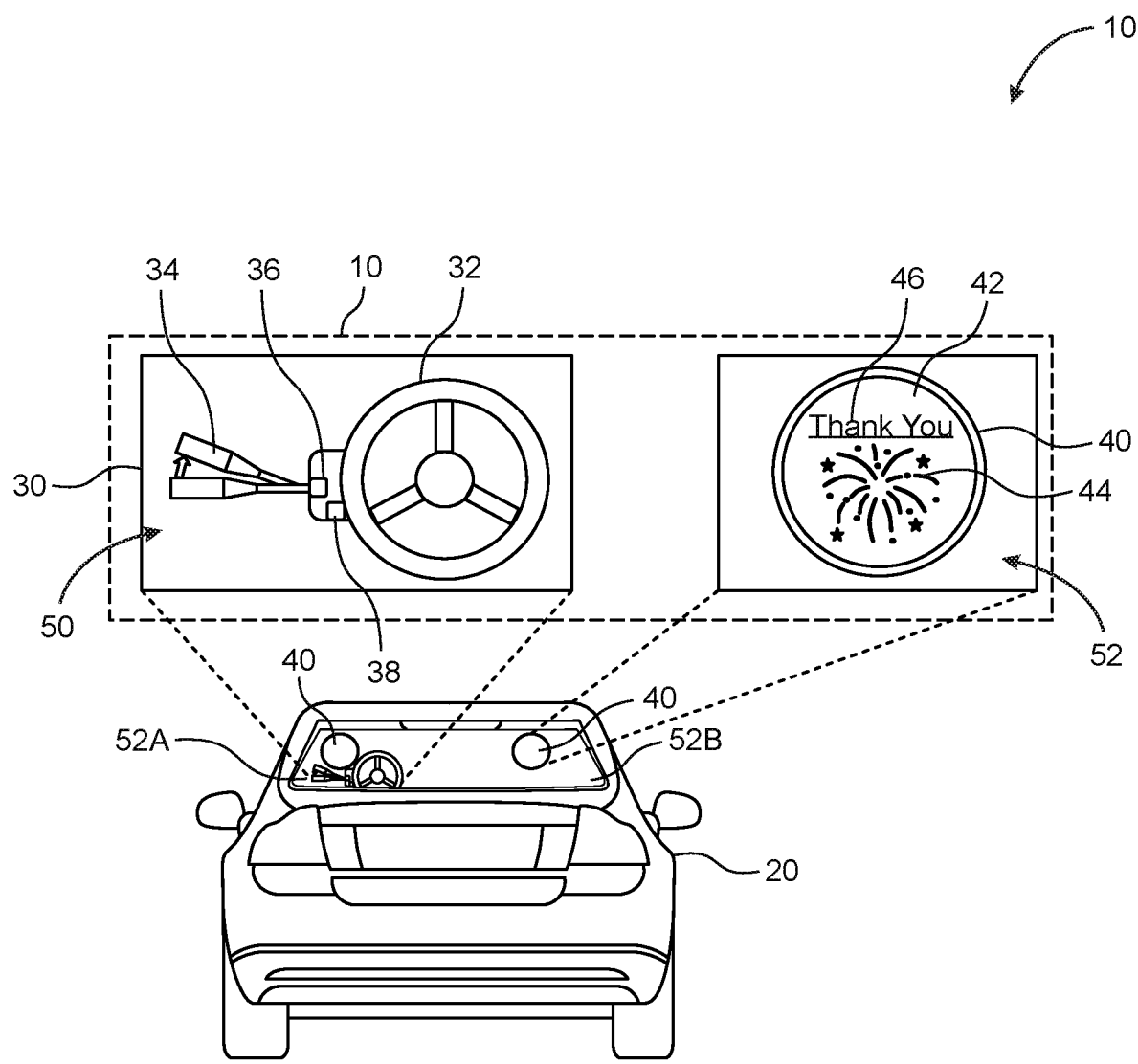
FIG. 1 represents an overview of an exemplary illuminated message display indicator system 10 of present invention, according to various embodiments described herein.

Referring now to the drawings, FIGS. 1 to 3, where the present invention is generally referred to with numeral 10, it can be observed that an illuminated message display indicator system for vehicles, in accordance with one embodiment, is provided that includes various components, as described hereinafter.

Figure 2:
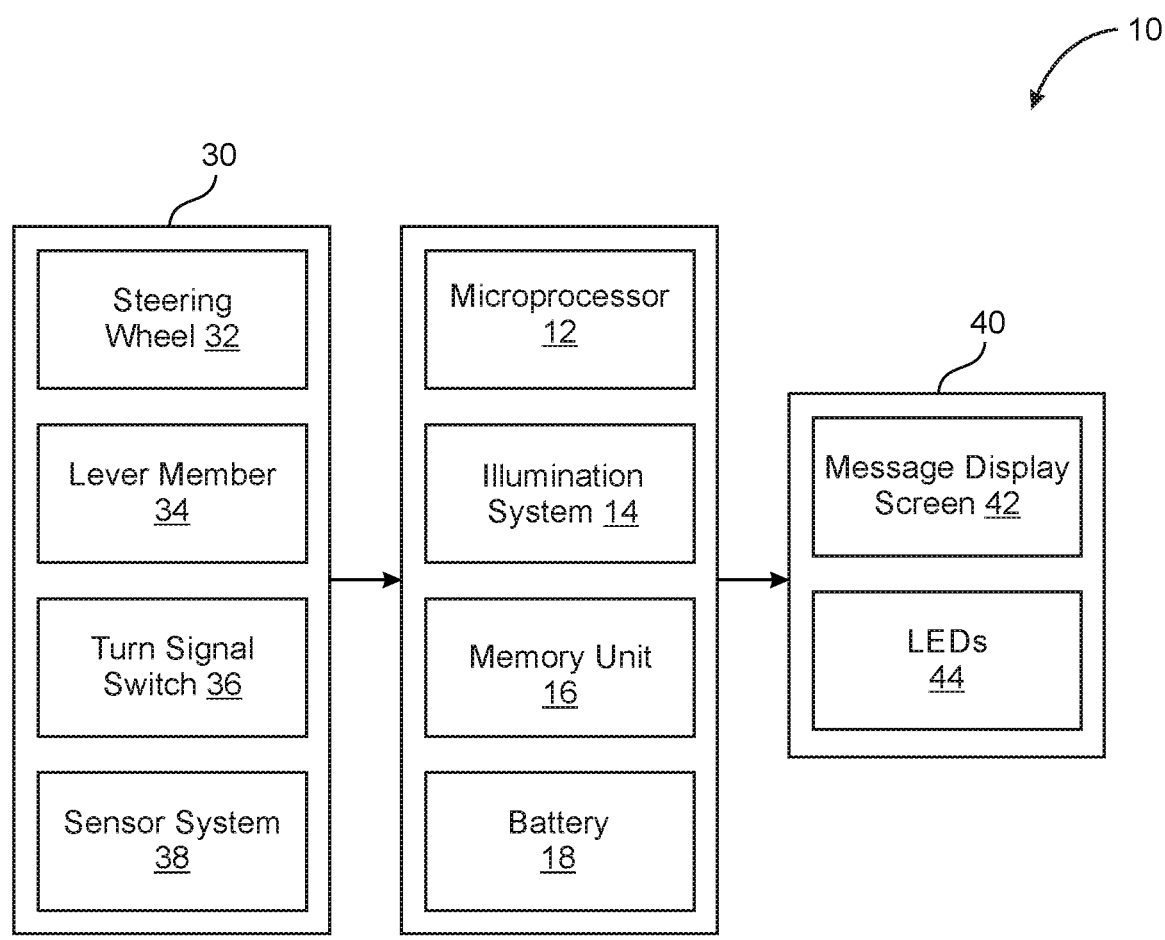
FIG. 2 represents a block diagram of exemplary illuminated message display indicator system 10 of present invention, according to various embodiments described herein.

FIG. 1 represents an exemplary illuminated message display indicator system 10 for vehicles of present invention, according to various embodiments described herein. Specifically, FIG. 1 represents an overview of an exemplary illuminated message display indicator system 10 of the present invention, according to various embodiments described herein. FIG. 2 represents a block diagram of an exemplary illuminated message display indicator system 10 of the present invention, according to various embodiments described herein.

The illuminated message display indicator system 10 may be retrofitted onto a vehicle 20. The illuminated message display indicator system 10 may include a steering system 30 installed in the front dashboard in the vicinity of the front windshield 50 of vehicle 20. The illuminated message display indicator system 10 may further include two instances of a display indicator 40 attached towards the two sides 52A and 52B of a rear windshield 52 of vehicle 20. The illuminated message display indicator system 10 may include a microprocessor 12, an illumination system 14, a memory unit 16, and a battery 18. The steering system 30 may include a steering wheel 32, a lever member 34, a turn signal switch 36, and a sensor 38. Each instance of the display indicator 40 may be a rigid housing that may include a message display screen 42 and LEDs 44.

The microprocessor 12 may include a processing unit that may be an X86-based processor, a Reduced Instruction Set Computing (RISC) processor, an Application-Specific Integrated Circuit (ASIC) processor, a Complex Instruction Set Computing (CISC) processor, a microcontroller, a central processing unit (CPU), a coprocessor, and/or other processors or integrated circuits. In accordance with an embodiment, microprocessor 12 may be configured to retrieve one or more messages 46 from memory unit 16. Microprocessor 12 may be further configured to communicate one or more messages 46 retrieved from memory unit 16 to message display screen 42 for display. Microprocessor 12 may be further configured to control at least one illumination system 14 and message display screen 42.

The illumination system 14 may be configured to illuminate LEDs 44 positioned on each instance of display indicator 40 in response to deactivation of a turn signal switch 36 determined by sensor 38. Illumination system 14 may be further configured to illuminate LEDs 44 based on a defined pattern selectable by a user.

Memory Unit 16 may be configured to temporarily store various data, such as one or more messages 46 in one or more languages, illumination patterns of LEDs 44, and the like.

Battery 18 may be configured to provide power to various electronic and electrical components, such as illumination system 14, microprocessor 12, and message display screen 42. In an embodiment, battery 18 may be a rechargeable battery that may be charged from an external power supply via, for example USB power and data cable. In an embodiment, battery 18 may be lithium-ion batteries that are small, durable, and are long lasting. Alternatively, battery 18 may be recharged when power level drops below a selected threshold power level.

Steering wheel 32 may be a part of steering system 30 of vehicle 20 that is manipulated by a driver of vehicle 20 to control the direction of vehicle 20.

Lever member 34 may be manipulated by the driver of vehicle 20 when the driver wants to operate a turn signal or indicator lights on the front, sides and rear of vehicle 20. It is usually operated by lifting or lowering lever member 34, direction being commensurate with clockwise or anticlockwise direction in which steering wheel 32 is about to be turned. Thereby meaning a left turn is indicated by lowering lever member 34, while a right turn is indicated by lifting lever member 34.

Turn signal switch 36 may be configured to perform several functions, both electrical, and mechanical, while indicating a vehicle turn. Electrically, turn signal switch 36 signals the turn signal flasher to flash either right or left turn lights, both front and rear. Mechanically, turn signal switch 36 maintains turn signal flasher function until steering wheel 32 is reversed from turn direction selected. For example, if a left turn signal is selected, turn signal switch 36 will maintain a flashing left turn signal until steering wheel 32 is turned a certain amount counterclockwise (for a left turn), then turned clockwise back to a straight-ahead, or centered position. Same is true for a right turn. In accordance with an embodiment, turn signal switch 36 may be configured to be activated in response on an action performed by a user on lever member 34 upon negotiation of a turn while vehicle 20 is in driving mode.

Sensor 38 may be configured to determine an activation or deactivation of turn signal switch 36 while vehicle 20 is in a driving mode. Sensor 38 may transmit such determined deactivation of turn signal switch 36 to microprocessor 12 of illuminated message display indicator system 10 to display desire message to other drivers. In accordance with an embodiment, sensor 38 may be controlled by a remote-controlled sensor system (not shown). Many possible variations in terms of sizes, colors, designs, symbols, language and different power connection systems may be possible.

Each instance of display indicator 40 may be attachable to rear windshield 52 via a fastening mechanism. Fastening mechanism corresponds to one of adhesive strips, vacuum cups, or self-adhesive tapes. Each instance of the display indicator 40 may include a message display screen 42 and LEDs 44. In various embodiments, each instance of the display indicator 40 may be made from any material such as plastic and can be of any size or shape.

Message display screen 42 of each instance of display indicator 40 may correspond to a display screen that may be configured to display one or more messages 46 associated with the directional indicia. The directional indicia may correspond to a directional indication provided by sensor 38.

LEDs 44 of each instance of display indicator 40 may correspond to semiconductor light sources that emit light when current flows through them. Such LEDs 44 are evenly spaced over message display screen 42 of each instance of display indicator 40.

One or more messages 46 displayed on the corresponding instances of display indicator 40 may comprise one or more of a gesture, a textual content, a graphical icon, or an emoticon. For example, a message may be "Thankyou" and/or an icon showing negotiated direction. One or more messages 46 may be customized based on the language preferences of a user. One or more messages 46 may continue to display on corresponding instance of display indicator 40 until vehicle 20 has taken a turn. For example, a message may be displayed on the left instance of display indicator 40 attached towards first side 52A of rear windshield 52 for at least 5 seconds or the duration of turning vehicle 20 towards the left. Preferably the messages displayed by the present invention occur after a turn has been successfully made.

Figure 3:
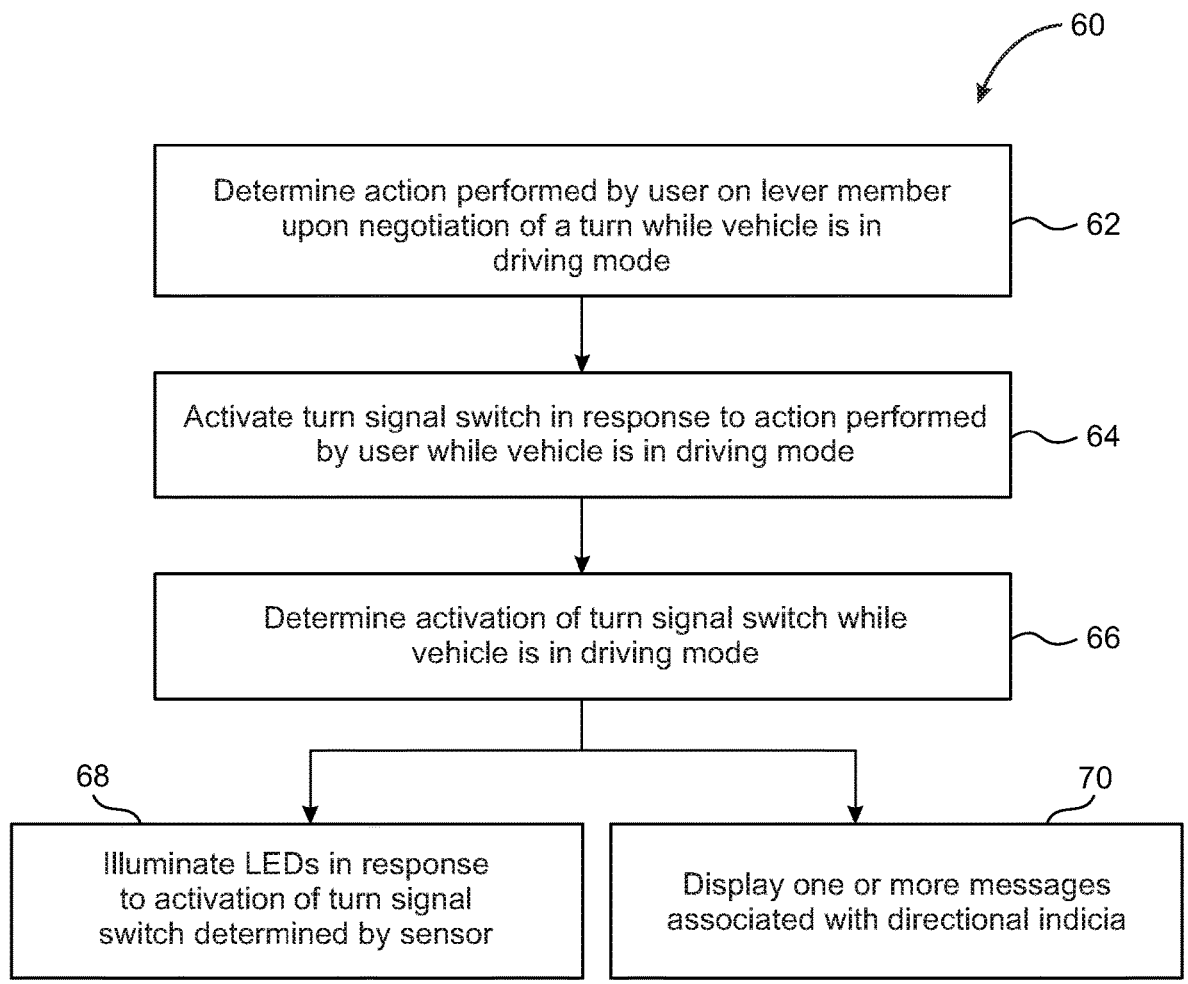
FIG. 3 represents a flowchart depicting how the illuminated message display indicator system 10 of the present invention functions, according to various embodiments described herein.

FIG. 3 represents flowchart depicting an illuminated message display indicator method 60 of the present invention, according to various embodiments described herein.

At step 62, an action performed by a user on lever member 34 upon negotiation of a turn may be determined while the vehicle 20 is in driving mode. The action may correspond with lifting or lowering lever member 34 while negotiating of a turn in a specific direction, according to different embodiments. Said differently, movement of lever member 34, such as lifting or lowering, determines which direction, left or right, a vehicle 20 is to be turned to by user.

At step 64, in response to an action performed by a user while vehicle 20 is in driving mode, turn signal switch 36 may be activated. As described above, electrically, turn signal switch 36 signals turn signal flasher to flash either right or left turn lights, both front and rear. Mechanically, turn signal switch 36 maintains turn signal flasher functioning until the steering wheel 32 is reversed from the turn direction selected.

At step 66, activation or deactivation of turn signal switch 36 may be determined by sensor 38 while the vehicle 20 is in driving mode. Sensor 38 may transmit directional indicia associated with such determined deactivation of turn signal switch 36 to microprocessor 12 of illuminated message display indicator system 10.

At step 68, LEDs 44 of corresponding instance of display indicator 40 may be illuminated by illumination system 14 in response to deactivation of turn signal switch 36 and directional indicia determined by sensor 38. Illumination system 14 may be configured to illuminate LEDs 44 of corresponding instance of display indicator 40 based on a defined pattern selectable by a user after a turn has been successfully made. In an embodiment, illumination system 14 of corresponding instance of display indicator 40 may be controlled by microprocessor 12 and powered by battery 18.

At step 70, one or more messages 46 associated with directional indicia may be displayed at message display screen 42 on corresponding instance of display indicator 40. In an embodiment, microprocessor 12 may be configured to communicate one or more messages 46 retrieved from memory unit 16 to message display screen 42 of corresponding instance of display indicator 40 for display. Thus, microprocessor 12 may be configured to control message display screen 42 of corresponding instance of display indicator 40.

In an alternate embodiment, the present invention may be in the form of a sticker which simply mounts to a predetermined location on the exterior rear of a vehicle with an adhesive. Other attachment means such as by snap buttons or hook and loop straps may be suitable as well. The alternate embodiment may have lights as the aforementioned embodiments, however, in this embodiment the present invention may be protected by a plastic covering. The plastic covering may prevent water from reaching the present invention to prevent damage from weather elements, for example. The present invention in this alternate embodiment may be powered with batteries as the present invention would not plug into any component of the vehicle. Instead, in this alternate embodiment, the present invention is a standalone device that achieves the same goal as previously mentioned, which is to be kind and thankful to other drivers that a user may be sharing the road with. A user may simply purchase new stickers to replace the existing one as they become damaged or worn out or even out of boredom. Thereby resulting in a disposable version of the present invention. This alternate embodiment allows a user to more easily retrofit the present invention onto existing vehicles which they may own. It should be appreciated that the present invention is not to be limited by materials, size or shape. A user may customize the present invention as they desire. They may additionally, customize the messages or images displayed on the present invention.

Thus, proposed invention provides various advantages. Two instances of display indicator 40 of illuminated message display indicator system 10 may be attached to rear windshield 52 on each of left side and right side. Once a left signal is turned on and after a left turn has been made then LEDs 44 on message display screen 42 of left instance of display indicator 40 towards left side lights up and displays a message like "Thank you." It also helps to further indicate to other drivers that vehicle 20 is to turn left or is trying to merge left in the case that the LEDs 44 of the present invention turn on with the turn signals. Preferably the illuminated message display indicator system 10 may indicate to drivers of rear vehicles that the driver of vehicle 20, which is the leading vehicle, is being courteous to drivers of rear vehicles by saying kind words like, "Thank you" after they have successfully completed their desired turn. Since it is a nice gesture and a nice message displayed, message display indicator system 10 may encourage users to use their turning signals more frequently resulting in safer driving. Further, illuminated message display indicator system 10 may prevent road rage while in traffic.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. An illuminated message display indicator system, comprising:
   a vehicle with a steering system and a rear windshield, said steering system including a steering wheel and a turn signal switch;
   a sensor configured to determine a deactivation of the turn signal switch while the vehicle is in a driving mode, said sensor being within said vehicle and adjacent to said steering wheel, said turn signal switch being deactivated when said steering wheel returns to a centered position after a turn is completed;
   display indicators, said display indicators being attached onto said rear windshield at lateral sides of the rear windshield, wherein each of said display indicators further includes a message display screen displaying one or more messages associated with a directional indicia provided by said sensor, said display indicators being parallel to each other, said one or more messages being customizable;
   an illumination system configured to illuminate light emitting diodes (LEDs) positioned within said display indicators in response to said directional indicia and said deactivation of said turn signal switch determined by said sensor to illuminate said one or more messages; and
   a microprocessor configured to control said illumination system and said message display screen when said sensor determines said turn signal switch has been deactivated.

2. The illuminated message display indicator system according to claim 1, wherein said one or more messages include one or more of a gesture, a textual content, a graphical icon, or an emoticon.

3. The illuminated message display indicator system according to claim 1, said display indicators are attachable to said rear windshield via a fastening mechanism.

4. The illuminated message display indicator system according to claim 3, wherein said fastening mechanism corresponds to one of adhesive strips, vacuum cups, or self-adhesive tapes.

5. The illuminated message display indicator system according to claim 1, wherein a battery is configured to power said illumination system, said microprocessor, and said message display screen.

6. The illuminated message display indicator system according to claim 1, wherein said turn signal switch is configured to be activated in response an action performed by a user on a lever member upon negotiation of said turn while said vehicle is in said driving mode.

7. The illuminated message display indicator system according to claim 1, wherein said microprocessor is further configured to retrieve said one or more messages from a memory unit.

8. The illuminated message display indicator system according to claim 7, wherein said microprocessor is further configured to communicate said one or more messages retrieved from said memory unit to said message display screen for display.

9. The illuminated message display indicator system according to claim 1, wherein said LEDs are evenly spaced.

10. The illuminated message display indicator system according to claim 1, wherein said illumination system is configured to illuminate said LEDs based on a defined pattern selectable by a user.

\* \* \* \* \*